(12) United States Patent
Kerns

(10) Patent No.: US 12,446,870 B2
(45) Date of Patent: *Oct. 21, 2025

(54) DEVICE FOR ATRAUMATIC PASSAGEWAY OF INSTRUMENTS WITH OR WITHOUT DILATION

(71) Applicant: AMARASTESIA LTD, West Palm Beach, FL (US)

(72) Inventor: Roxana Belciu Kerns, West Palm Beach, FL (US)

(73) Assignee: AMARASTESIA LTD, West Palm Beach, FL (US)

( * ) Notice: Subject to any disclaimer, the term of this patent is extended or adjusted under 35 U.S.C. 154(b) by 133 days.

This patent is subject to a terminal disclaimer.

(21) Appl. No.: 18/530,003

(22) Filed: Dec. 5, 2023

(65) Prior Publication Data

US 2024/0099709 A1    Mar. 28, 2024

Related U.S. Application Data

(63) Continuation-in-part of application No. 17/481,070, filed on Sep. 21, 2021, now Pat. No. 11,904,122.

(60) Provisional application No. 63/494,972, filed on Apr. 7, 2023, provisional application No. 63/430,526, filed on Dec. 6, 2022, provisional application No. 63/224,220, filed on Jul. 21, 2021, provisional application No. 63/196,873, filed on Jun. 4, 2021.

(51) Int. Cl.
*A61B 17/02* (2006.01)
*A61B 17/00* (2006.01)

(52) U.S. Cl.
CPC ..... *A61B 17/0218* (2013.01); *A61B 2017/00867* (2013.01); *A61B 2017/0225* (2013.01)

(58) Field of Classification Search
CPC ...... A61B 17/0218; A61B 2017/00867; A61B 2017/0225; A61B 2017/00862
USPC .................................................. 600/201–245
See application file for complete search history.

(56) References Cited

U.S. PATENT DOCUMENTS

| | | | |
|---|---|---|---|
| 3,431,910 A | 3/1969 | Kokx | |
| 3,706,311 A | 12/1972 | Kokx et al. | |
| 3,902,493 A | 9/1975 | Baier et al. | |
| 5,011,488 A * | 4/1991 | Ginsburg | A61B 17/22032 604/908 |
| 5,279,548 A * | 1/1994 | Essig | A61B 17/42 604/27 |

(Continued)

FOREIGN PATENT DOCUMENTS

| | | |
|---|---|---|
| WO | 2021/074917 A1 | 4/2021 |
| WO | 2022/255897 A1 | 12/2022 |

OTHER PUBLICATIONS

PCT International Search Report and Written Opinion of the International Searching Authority for International Application No. PCT/RO2022/050001 (published as co-pending application WO 2022/255897) mailed Jul. 14, 2022.

*Primary Examiner* — Julianna N Harvey
*Assistant Examiner* — Tara Rose E Carter
(74) *Attorney, Agent, or Firm* — Tucker Ellis LLP

(57) ABSTRACT

A device, comprising: a tubular member which is flexible, the tubular member forming a channel when in an open and active configuration and the tubular member narrowed when in a closed and inactive configuration. The device, once expanded into the open and active configuration provides for a channel. The channel provides for a passthrough for medical instruments.

24 Claims, 10 Drawing Sheets

(56) References Cited

U.S. PATENT DOCUMENTS

| | | |
|---|---|---|
| 5,782,745 A | 7/1998 | Benderev |
| 2007/0282161 A1 | 12/2007 | Ferguson |
| 2008/0146872 A1 | 6/2008 | Gruber |
| 2008/0156323 A1* | 7/2008 | Angel ............... A61M 16/0434 |
| | | 128/207.14 |
| 2011/0172694 A1 | 7/2011 | Ackerman |
| 2014/0100417 A1 | 4/2014 | Durling |

* cited by examiner

DEVICE FOR ATRAUMATIC PASSAGEWAY OF INSTRUMENTS WITH OR WITHOUT DILATION

CROSS-REFERENCE TO RELATED APPLICATIONS

The present application is a continuation-in-part of U.S. patent application Ser. No. 17/481,070, filed on Sep. 21, 2021, and which claims benefit to U.S. Provisional Patent Application Nos. 63/224,220 filed on Jul. 21, 2021, and 63/196,873 filed on Jun. 4, 2021, which are herein incorporated by reference in their entirety. This application also claims the benefit of U.S. Provisional Patent Application Nos. 63/430,526 filed on Dec. 6, 2022, and 63/494,972 filed on Apr. 7, 2023, which are herein incorporated by reference in their entirety.

FIELD

The present disclosure relates generally to a device for atraumatic passageway of medical and surgical instruments with or without dilation of a stenotic anatomical orifice and or cavity; in particular cervical canal dilator, anorectal canal dilator, urethral dilator. More specifically, the present teachings describe a disposable medical device used in surgical procedures (e.g., gynecological, urological, gastroenterology, laparoscopy) to instrument and dilate free of trauma stenotic or otherwise closed anatomical orifices (uterine cervix, anal canal, urethra, esophagus, spine, laparoscopy access ports) and to allow passage of medical instruments inside the cavity (uterus, rectum, bladder, abdominal cavity, joints).

BACKGROUND

Surgical Gynecological procedures refer to medical surgery or interventions on the female reproductive system. A dilator, medical (surgical) device, is used to expand a closed, stenotic or otherwise small opening or passage such as cervix, urethra, esophagus, rectum or vaginal introitus during procedure(s) or for treatment(s). The dilators available currently in the industry are essentially metallic or plastic and have encountered several limitations. They require (re)sterilization, a process that removes, kills or deactivates all forms of life. The dilators available need additional, skilled assistance for instrumentation, a trained and skilled medical assistant or nurse which can be quite costly and not time efficient. The dilators available come in increasing sizes and require multiple instrumentation to achieve a desired opening; therefore, increased risk for trauma (require stabilization by uterine tenaculum), increased operating time and anesthetic dosage. Often times metallic dilators cannot open a closed cervix and procedures risk to be canceled after induction of anesthesia. The force exerted from the present dilators can cause trauma to cervical canal and even perforate uterus, which require additional medical treatments, hospitalization, increased cost. Other available dilators require complex and expensive methodology (e.g., Balloon dilators) or and need long time to achieve a dilated state (e.g., Osmotic cervical dilator or laminaria).

SUMMARY

The present disclosure relates to a device for atraumatic passageway of instruments with or without dilation.

The present disclosure relates to a device comprising: a tubular member composed of a flexible material, the tubular member forming a channel when in an open and active configuration and the tubular member narrowed when in a closed and inactive configuration.

The present teachings relate to a device which is configurable between a closed and inactive configuration for insertion into an anatomical orifice of a patient and an open and active configuration to form a passageway, and optionally dilate, for a surgical device through the device and the anatomical orifice and into a cavity of a patient, the device comprising: a) a tubular member comprising a flexible material, wherein the tubular member is configured to expand from the closed and inactive configuration to the open and active configuration; b) a channel formed in in the tubular member when in an open and active configuration which provides the passageway which extends through the proximal end and the distal end; c) one or more wires which form an inner metallic core inside of the flexible material of the tubular member; d) one or more biasing devices configured to retain the tubular member and the plurality of wires in the closed and inactive configuration; and wherein removal of the one or more biasing devices causes the plurality of wires to recoil against and exert an outward force on an interior of the tubular member such that the tubular member expands from the closed and inactive configuration to the open and active configuration.

The present teachings relate to a method using the device of the teachings for providing a passageway in and/or dilating the anatomical orifice, the method comprising: a) inserting the device into the anatomical orifice; and b) expanding the device by removing one or more biasing devices to provide for expansion of the device from the closed and inactive configuration to the open and active configuration thus forming the channel within the tubular member of the device and providing the passageway in the anatomical orifice.

The device, once expanded, provides a channel. The channel is especially beneficial in allowing pass-through of one or more medical/surgical devices (e.g., instruments) therethrough.

The present disclosure relates to a method of atraumatic passing through a canal with or without dilation the method comprising: a) inserting the device into the canal; and b) expanding the device to provide for opening of the canal and a channel formed within a tubular member of the device.

The present disclosure provides for a device which may be disposable, such that a user is able to utilize it without need for re-sterilization. The device may be useful during gynecological procedures but also related medical procedures. These procedures may encounter a stenotic orifice that needs opening for passage of instruments or visualization. (e.g., rectal instrumentation, urethra instrumentation, esophageal or joints).

The present teachings provide a device that may prevent and or reduce mechanical traumatic risk to anatomical structures. The trauma may be prevented or reduced by the use of a soft possible medicated expandable outer structure.

The present teachings provide for a device that may be self-expanding and able to overcome the natural compressive forces in a cavity, canal, joint to result in dilation of the cavity. The device may include a tubular member and/or core which is able to apply an outward force. For example, the device may include an inner metallic core. The inner metallic core may comprise a plurality of wires that are held in a compressed position but are capable to expand into an open, accessible position. Upon expansion, these wires may cause overall enlargement of the channel within the device and thus dilation of the cavity. It is also possible the expansion may be feasible without the use of wires and other properties of the core or tubular member.

The present teachings provide for simple means for a single user to transition the device from a closed and inactive configuration to an open and active configuration. The device may be provided with a string and/or sleeve which may easily be removed when triggering the device in active configuration. Upon removal, one or more outward forces may allow for expansion of the device. For example, a string may reside within one or more wires (e.g., centered, off-center). A user can remove the string to release the wires to expand into the softer external material by simply pulling the metallic string out. The string may be the center piece of the device or off-center piece of the device and when triggered can activate the present device to dilate and open the cervix or similar anatomical structures as exemplified above (urethra, anal canal). As another example, a sleeve may reside about the tubular member. A user can remove the sleeve to release the hyper elastic wires to recoil into expansion.

The present teachings provide for a device that once in the open and active configuration provide for a pass-through channel. The channel may be unobstructed. The channels may allow passage of hysteroscope or other medical and surgical devices. Exemplary medical devices include, but are not limited to, optic cameras, curets, suction catheter, uterine measuring devices, polyp baskets or scissors (urethroscope, rectoscope, laparoscopy trocars).

DETAILED DESCRIPTION

Figure 1:
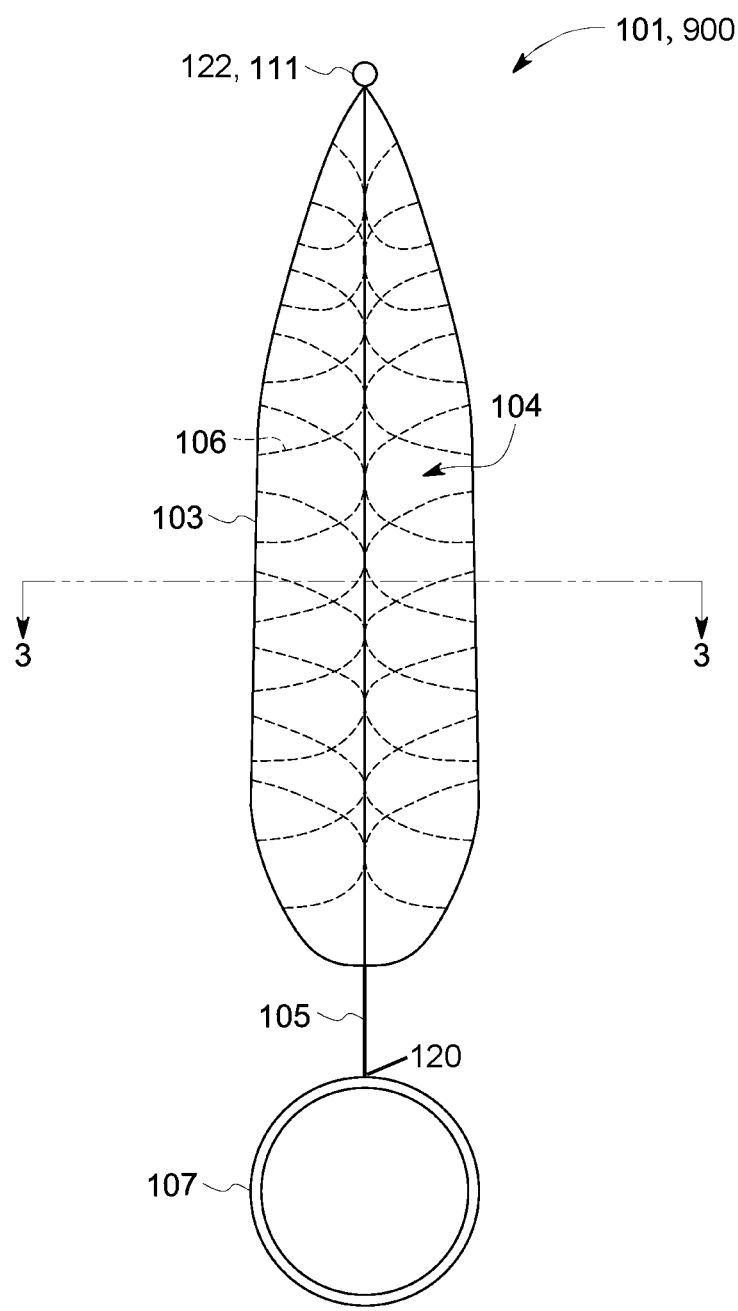
FIG. 1 is a front view of a device.

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The teachings of U.S. Provisional Application No. 63/196,873 filed on Jun. 4, 2021, and 63/224,220 filed on Jul. 21, 2021; U.S. Nonprovisional application Ser. No. 17/481,070 filed on Sep. 21, 2021; and PCT Application No. PCT/R02022/05001 filed on Mar. 23, 2022, are incorporated herein by reference in their entirety.

The present teachings relate to a device. The device may be a surgical access device. The device may provide access with or without dilation. The device may be referred to as an anatomical dilator, atraumatic passthrough device, or both. The device may function to dilate one or more anatomical cavities, allow for atraumatic insertion of one or more medical devices into the cavity, prevent or reduce trauma, provide for an easily disposable dilation device, or any combination thereof. The device may be suitable for dilating any stenotic or anatomical structure, allow passage of one or more medical devices therethrough, or both. The device may be used solely as a passage for medical device(s) without resulting in dilation but still protecting anatomical structures from trauma. The device may allow for a user, such as a medical professional (e.g., doctor, nurse) to dilate a human cavity (e.g., cervix, urethra, esophagus, rectum, vaginal introitus, or other). The device may provide a disposable and pass-through anatomical device. The present teachings may allow for a user to dilate a human cavity without trauma, without extraordinary skilled training, without need for re-sterilization, without requiring a complex operating surgical environment (hospital or ambulatory surgical center), and in a time efficient and sterile medical office setting. The device may have a closed and inactive configuration which allows for easy insertion into the cavity. The device may have a twisted configuration which may allow for compression and easy insertion or removal from a cavity. The device may be configured to expand into an open and active configuration which expands (e.g., dilates) the cavity. Upon expansion, the device may then provide a channel for other medical devices to pass therethrough to access the desired location within or beyond the cavity. The device may be a device having a biasing member(s) therein such as to cause an open and active configuration, retain a closed and inactive configuration, or both. The device may be a device having one or more coatings, such as soft coatings, about the biasing member(s) and expandable by the biasing member(s). The device may be a member having a body having a soft coating about its exterior and which is expandable by a biasing member within its interior and/or be the biasing member. The device may include a tubular member, channel, string (s), wire(s), biasing member(s), coatings, handle, powered applicator, hook, locking clip, the like or any combination thereof.

The device may include a tubular member. The tubular member may function as the body of the device, may constrict into a closed and inactive configuration, may expand into an open and active configuration, may provide for a channel, may house one or more wires, may house a core (e.g., inner core, inner metallic core), may provide a pass through for one or more medical devices, the like, or any combination thereof. The tubular member may have any size and/or shape suitable for being inserted into one or more anatomical cavities and expanding the cavity to a suitable size for one or more medical devices to be inserted therein and pass therethrough. The tubular member may have a shape reciprocal with the one or more cavities while in the inactive and closed position. The tubular member may have a size smaller than or just about the same size as the one or more cavities while in the inactive and closed position. The tubular member may define a channel, may include a core, may house one or more wires, may be surrounded by a sleeve, the like, or any combination thereof.

The tubular member may be configured to have a hollow interior. The hollow interior may form a channel. The channel may be where one or more medical (e.g., surgical) devices may pass through, one or more wires and/or strings may reside, a core may be located, or any combination thereof. The channel may be defined by the interior and/or interior surface of the tubular member. When the device is in a closed and inactive configuration, the channel may be closed, non-existent, narrower, constrained, blocked, and/or the like. When the device is in the open and active configuration, the channel may be open, wider, unblocked, provide a pass through, and/or the like. The channel may extend partially and/or completely through the tubular member. The channel may pass from a proximal end of the tubular member through a distal end of the tubular member. By passing through the entirety of the tubular member, the device may provide a pass through for one or more surgical devices.

The outer, external surface of the tubular member, that comes in contact with the interior surface of the anatomical orifice, canal, cavity (such as tissue of the cervix) may be soft, have a smooth surface, or both.

The tubular member may be provided with a plurality of pleats. The plurality of pleats may be formed on an inside surface, outside surface, or both of the tubular member. The plurality of pleats may be disposed around a cross-section of the tubular member. The plurality of pleats may be capable of opening in an external direction (e.g., away from the inner surface of the cavity, pushing the inner surface of the cavity out into an open position). The pleats may be configured to be pushed outward and open by a core (e.g., one or more wires), such as when triggered (e.g., pulling/removing the string away from the proximal end of the tubular member). The pleats may be smooth and soft. The plurality of pleats may be inverted to match with the plurality of inner wires or sleeve(s). When the wires are released and stretched to a dilated position (e.g., open and activated), they will push the plurality of pleats of the tubular member expanding them towards the anatomical inner surface.

The tubular member may include or be free of a core. The core may function to include and/or house one or more wires. The core may be defined by the wires, may house the wires, may include the wires, or any combination thereof. The core may provide structure to the tubular member. The core may support and/or be the plurality of pleats. The core may reside within the hollow interior and thus within the channel. The core may be made of any material usable in medicine and healthcare. The one or more core materials may be one or more biocompatible materials. A core comprising one or more metals may be referred to as a metal core. For example a core having one or more wires comprising metal and/or including metal for supporting the wires may be referred to as a metal core, metallic core, inner metallic core, and/or the like.

The tubular member may be comprised of one or more tubular member materials. The softer part of the device may encompass a composite or a combination of materials. The soft, outer surface of the tubular member may be made of highly compressed absorbent material which has a natural resiliency. The soft outer surface of the tubular member may be made of a material that when wet with fluid will tend to expand in an attempt to regain its initial shape without a strong adherence to the body tissues. The tubular member may be made of material similar to a "vaginal tampon material" as for example described in this patent U.S. Pat. No. 3,706,311, incorporated herein by reference in its entirety. The softer, external material of the tubular member can potentially be medicated as needed or desired for example with hemostatic absorbing materials, antibiotics, antifungals, and/or the like. The one or more tubular member materials may include one or more metals, ceramics, polymers, the like, or a combination thereof. The one or more metals may include stainless steel (e.g., 440 stainless steel), copper, nickel, titanium, cobalt chrome, aluminum, magnesium, gold, platinum, silver, iridium, tantalum, one or more alloys thereof, the like, or one or more combinations thereof. For example, one or more metals may be Nitinol (e.g., alloy of nickel and titanium). One or more polymers may include medical grade silicone, polyvinylchloride, polypropylene, Polytetrafluoroethylene, Polymethylmethacrylate, Trimethylcarbonate, TMC NAD-lactide, the like, or a combination thereof. For example, the one or more tubular member materials may include very fine Nitinol with a pre-determined tension strength and size such that when open, they release and expand at a pre-determined distance. (e.g., Young Modulus Factors). The one or more materials may be a shape memory alloy. For example, Nitinol may be used as a shape memory alloy. Nitinol may be temperature activated Nitinol, highly elastic Nitinol, or both. The Nitinol or other similar material may be trained (i.e., pre-trained) to a specific shape. The material may be trained into the open and active configuration that allows for dilation. Thus, the material may be compressed into the closed and inactive configuration and then once a compression force is removed, an activation temperature is applied, or both, the material may expand into the open and active configuration. One or more tubular member materials may be temperature activated. Temperature activation may occur at a transition temperature; a temperature below, at, or above ambient; a temperature below, at, or above the temperature within the human body; or any combination thereof. Temperature activation may allow for expansion of one or more tubular member materials (e.g., Nitinol) when exposed to temperatures encountered within the human body, lower temperatures than previously exposed to, or both. Temperature activation may allow for one or more tubular members to remain compressed when at ambient temperature and/or outside the anatomical cavity.

The device may include one or more biasing members. One or more biasing members may function to retain the device in a closed and inactive configuration, expand the device into an open and active configuration, or both. One or more device members may be formed by the material properties of the tubular member, one or more wires, one or more strings, one or more sleeves, or any combination thereof.

The dilator may include one or more wires. The one or more wires may function to hold the tubular member in a compressed, closed, and/or inactive configuration. The one or more wires may function to hold one or more pleats together. The one or more wires may function to expand a tubular member into an enlarged, open, and/or active configuration. The one or more wires may function to allow for a tubular member to expand. The one or more wires may have a tension strength. The tension strength may be predetermined. The tension strength may be progressively increased or decreased from a distal end of the tubular member to a proximal end (e.g., base) such that in expanded position (e.g., open and active configuration) the tubular member assumes a cylindrical shape allowing free pass through of medical instruments. The wires may be located within an interior, exterior, or both of the tubular member. The one or more wires may be retained within a channel. The one or more wires may be formed as one or more coils. One or more coils may include a singular coil with a plurality of turns. One or more coils may include a plurality of circular coils which are stacked. The plurality of coils may be connected or disconnected. One or more coils may be a plurality of wound coils along the device. The wires may be equally distributed across the radius and length of the tubular member and overlap. In open, dilated, active position the wires may recoil into a stretched curvilinear position which form the tubular structure with a passthrough opening. The one or more wires may be located about the tubular member. The one or more wires may be coiled about the tubular member. The one or more wires may be expanded by removal of compressive force, exposure to a change in temperature, or both. Compressive force can be applied by one or more strings, one or more sleeves, or both. The one or more wires may be exposed to a transition temperature or other elevated or decreased temperature.

One or more wires may comprise one or more wire materials. One or more wire materials may be any material suitable for medical use within a human body (e.g., biocompatible, medical grade), may be sufficiently strong to hold the wires in a closed configuration, may be elastic such as to be compressed and to allow for expansion, the like, or any combination thereof. The one or more wire materials may comprise one or more metals, polymers, the like, or a combination thereof. The one or more metals may include stainless steel (e.g., 440 stainless steel), copper, nickel, titanium, cobalt chrome, aluminum, magnesium, gold, platinum, silver, iridium, tantalum, one or more alloys thereof, the like, or one or more combinations thereof. For example, one or more metals may be Nitinol (e.g., alloy of nickel and titanium). One or more polymers may include medical grade silicone, polyvinylchloride, polypropylene, Polytetrafluoroethylene, Polymethylmethacrylate, Trimethylcarbonate, TMC NAD-lactide, the like, or a combination thereof. For example, the one or more wire materials may include very fine Nitinol with a pre-determined tension strength and size such that when open, they release and expand at a pre-determined distance. (e.g., Young Modulus Factors). The one or more materials may be a shape memory alloy. For example, Nitinol may be used as a shape memory alloy. Nitinol may be temperature activated Nitinol, highly elastic Nitinol, or both. The Nitinol or other similar material may be trained to a specific shape. The material may be trained into the open and active configuration that allows for dilation. Thus, the material may be compressed into the closed and inactive configuration and then once a compression force is removed, an activation temperature is applied, or both, the material may expand into the open and active configuration. One or more wire materials may be temperature activated. Temperature activation may occur at a transition temperature, a temperature at, above, or below ambient; a temperature at, below, or above the temperature within the human body; or any combination thereof. Temperature activation may allow for expansion of one or more tubular member materials when exposed to temperatures encountered within the human body, when applying cooling (e.g., about or within the anatomical orifice), applying additional heat, or any combination thereof. Temperature activation may allow for one or more tubular members to remain compressed when at ambient temperatures or below.

The device may include or be free of one or more strings. A string may function to hold one or more wires in an inactive and compressed configuration. A string may function to allow one or more strings to be released. The one or more strings may be a single string or a plurality of strings. One or more strings may include 1 or more strings, 2 or more strings, 3 or more strings, or even 4 or more strings. One or more strings may include 10 or less strings, 9 or less strings, 8 or less strings, or even 7 or less strings. A string may include a proximal end opposing a distal end. The proximal end may be the end of the string closest to the user. The proximal end may be engaged with, retain, and/or affixed to a handle. The distal end may be the end of the string which is first inserted into the cavity. The distal end may include a blunt tip, sharp tip, a needle tip, hook, medical treatments, optical viewing capability, the like, or any combination thereof. The string may be configured to slide away and toward a user and within the wires. Sliding away may allow for the blunt tip to come into contact with a distal surface of the cavity. Sliding toward may allow for disengagement from the wires. The one or more strings may be configured as a reinforced coil with a blunt end (e.g., reinforced blunt coil). One or more strings may be located within a center and/or off-center of a tubular member. One or more strings may be located within a center and/or off-center of one or more wires (e.g., relative to coils, loops, etc.). One or more strings may retain one or more wires coiled within the interior of a tubular member (e.g., channel). One or more strings may be located along a side of a tubular member. The side may be along the interior or the exterior. One or more strings may be gathered together or spread apart along an inside of the tubular member. One or more strings may be uniformly distributed, clustered together, or a combination thereof within a tubular member. One or more strings may be held in place by one or more other coils to the wires. One or more strings may be held in place by one or more locking clips. A string may have a size such that it may easily pass through the one more human cavities, allow for measurement, pass through the wires for removal, or a combination thereof. A string may also have a size such that it can be held in place by a locking clip. The string may have a diameter or other width larger than a width of an opening of a clip such that the locking clip is able to hold the string in place. One or more strings may be exchanged for another one or more strings throughout the procedure of placing and using a device. For example, a string with a camera may be exchanged for a string with a blunt or sharp tip or vice versa.

A string may have a blunt tip. A blunt tip may be configured to indicate to a user when the device is fully located within a cavity (e.g., function as a "finder"). A blunt tip may be configured to aid in measuring of a depth of a cavity. A blunt tip may be configured to apply one or more medical treatments. A blunt tip may be configured so as to be pushed up toward a distal surface of a cavity. For example, the blunt tip may be pushed up toward a uterine fundus so as to measure the depth of the uterine cavity. The blunt tip may be coated with a tissue friendly material, such as silicone or be the distal end of a reinforced blunt coil. The blunt tip may be at the distal end.

A string may have a sharp tip. A sharp tip may allow for removal of tissue, such as a biopsy, or other scraping or cutting of tissue. The sharp tip may allow for collection of tissue, polyp resection, and/or the like. The sharp tip may be at the distal end.

A string may have a needle tip. The needle tip may allow for one or more injectables to be passed on from the string into the patient. The string may also be hollow to cooperate with a needle tip.

A string may be configured as a suction catheter. The string may be hollow to allow for suction. The string may be in fluid communication with one or more suction devices. The string may thus allow for collection of one or more tissues from a cavity. For example, a string may have both a sharp tip and be a suction catheter.

The string may have one or more optical viewing devices affixed thereto. An optical viewing device may function to allow guiding in placement of the device, allow viewing of or within the cavity, identifying pathology, avoiding trauma, the like or any combination thereof. One or more cameras may be located at the distal end of the string. The camera may be a small, fiber optic camera. The camera may be 5 mm or less, 3 mm or less, or even 2 mm or less in width. The width may allow for easy passing through into the cavity with minimal trauma. The camera may be a SlimLine™ hysteroscope, incorporated herein by reference in its entirety.

The string may include one or more medical treatments. The distal end, such as the blunt tip or other (e.g., sharp tip) may have one or more medications applied thereon for application onto a surface of the cavity. One or more medications may include one or more antibiotics, antifungals, hemostatics (e.g., vitamin K), analgesics, muscle relaxants like, or any combination thereof. The sharp tip can function as an injector for botulinum toxin, hemostatics, electrical current or any combination of.

The string may include one or more measuring aids. The one or more measuring aids may function to measure a length of a cavity. The measuring aids may include one or more measuring lines. The measuring lines may be located along a length of the string. The measuring aids of the string may be marked down from the distal end (e.g., blunt tip) all the way to the proximal end (e.g., handle). The measuring lines may be in inches, centimeters, millimeters, and/or the like to allow precise measurements of the cavity.

One or more strings may comprise one or more string materials. One or more string materials may be any material suitable for medical use within a human body (e.g., biocompatible, medical grade), may be sufficiently strong to hold the wires in a closed configuration, may be sufficiently strong to allow for a pulling force, pushing force, cutting force, the like, or a combination thereof. The one or more string materials may comprise one or more metals, polymers, the like, or a combination thereof. The one or more metals may include stainless steel (e.g., 440 stainless steel), copper, nickel, titanium, cobalt chrome, aluminum, magnesium, gold, platinum, silver, iridium, tantalum, one or more alloys thereof, the like, or one or more combinations thereof. For example, one or more metals may be Nitinol (e.g., alloy of nickel and titanium). One or more polymers may include medical grade silicone, polyvinylchloride, polypropylene, Polytetrafluoroethylene, Polymethylmethacrylate, Trimethylcarbonate, TMC NAD-lactide, the like, or a combination thereof. The one or more string materials may be flexible or rigid along its length.

The device may include or be free of a handle. The handle may function to provide a grip for a string. The handle may have any size, shape, and/or configuration to allow for a user to pull and/or push a string. The handle may have an annular shape (e.g., ring), crescent shape, rod shape, the like, or any combination thereof. The handle may be affixed to the string. The handle may be located at a proximal end of the string. Pulling the handle toward the user may release the string from the wires.

The device may include a locking clip. A locking clip may function to hold a string in a neutral position. The locking clip may have any suitable size, shape, and/or configuration to retain the string to the tubular member. The locking clip may be configured as a U-clip, spring clip, the like, or a combination thereof. The locking clip may be positioned anywhere along the lengths of the string and tubular member such as to hole the string in a static position relative to the tubular member and retain the tubular member in a closed and inactive configuration. The locking clip may be situated at the proximal posterior midline of the tubular member. By unlocking the string (simply pulling it out of the lock), it becomes free to move inside the tubular member up towards the inside of the uterine cavity (or rectum or bladder) or downward releasing the metallic elastic wires into expansion.

The locking clip may comprise one or more clip materials. The one or more clip materials may have an elasticity to them, such as to provide for a biasing. The one or more clip materials may comprise one or more metals, polymers, the like, or a combination thereof. The one or more metals may include stainless steel (e.g., 440 stainless steel), copper, nickel, titanium, cobalt chrome, aluminum, magnesium, gold, platinum, silver, iridium, tantalum, one or more alloys thereof, the like, or one or more combinations thereof. One or more polymers may include medical grade silicone, polyvinylchloride, polypropylene, Polytetrafluoroethylene, Polymethylmethacrylate, Trimethylcarbonate, TMC NAD-lactide, the like, or a combination thereof.

The device may include one or more sleeves. A sleeve may function as an applicator, guide, compression fitting, the like, or any combination thereof. A sleeve may retain a tubular member, one or more wires, or both in a compressed state such that the device is in the closed and inactive configuration. Removal of a sleeve may allow for a tubular member, one or more wires, or both to expand such that the device transitions into the open and active configuration. The sleeve may be relatively smooth about its exterior. Smoothness may allow for smooth insertion into a cavity. The sleeve may be relatively smooth about its interior. Smoothness may facilitate easy removal from the tubular member, wires, or both. A sleeve may be hollow at one or both ends. The sleeve may be hollow at its distal end. A hollow distal end may allow for a distal end of a tubular member to pass therethrough and allow for the sleeve to be removed from about the tubular member.

A sleeve may be comprised of one or more sleeve materials. The one or more sleeve materials may include one or more metals, ceramics, polymers, the like, or a combination thereof. The one or more metals may include stainless steel (e.g., 440 stainless steel), copper, nickel, titanium, cobalt chrome, aluminum, magnesium, gold, platinum, silver, iridium, tantalum, one or more alloys thereof, the like, or one or more combinations thereof. For example, one or more metals may be Nitinol (e.g., alloy of nickel and titanium). One or more polymers may include medical grade silicone, polyvinylchloride, polypropylene, Polytetrafluoroethylene, Polymethylmethacrylate, Trimethylcarbonate, TMC NAD-lactide, the like, or a combination thereof. The one or more sleeve materials may be in the form of a sheet, rod, tub, film, the like, or any combination thereof.

The device may include one or more coatings. The one or more coatings may function to reduce trauma to a patient, provide for pain prevention, aid in visibility within a cavity, or any combination thereof. One or more coatings may be applied to an exterior of the tubular member, a sleeve, and/or any other component of the device. One or more coatings may be a soft coating such as reduce and/or prevent trauma. One or more soft coatings may be woven or non-woven. One or more coatings may include one or more medicaments. One or more coatings may have hemostatic absorbing qualities. One or more coatings may include one or more hemostatic agents. One or more soft coatings with hemostatic absorbing qualities may include a hemostatic gauze.

The device may include or be configured to cooperate with an automated device. The automated device may function to move the device into an open and active configuration, a closed and inactive configuration, a twisted configuration, or any combination thereof. The automated device may function to release one or more biasing devices, wires, strings, the like, or a combination thereof. The automated device may cause retraction of one or more strings, expansion of one or more wires, and/or the like. The automated device may be powered by a power source. A power source may be an outlet, battery pack, direct current, alternating current, or any combination thereof. The automated device may include a motor. The motor may drive one cogs, pulleys, sprockets, gears, belts, drive shafts, the like, or any combination thereof. The one or more mechanisms may be affixed to the one or more biasing devices, wires, strings, tubular member, sleeve, or any combination thereof such as to cause the open configuration and/or closed configuration. The automated device may be permanently affixed or temporarily and removably affixed to the device. One or more strings may be retractable into the automated device so as to cause the open and active configuration when retracted into the automated device. One or more wires may be extendable from an automated device such as to cause the open and active configuration when extended from the automated device. The automated device may remain outside of the cavity such as to be operable by a user.

The device may be configured to transition between a closed and inactive configuration to an open and active configuration. The device in the closed and inactive configuration may allow for easy insertion into an anatomical cavity, prevent trauma associated with insertion, or both. The device in the open and active configuration may expand (e.g., dilate) the cavity, allow for free insertion of surgical or other medical devices, and the like. The device may be transitioned from the closed and inactive configuration to the open and active configuration by pulling on a string, removing a string, removing a sleeve, exposing the device to a change in temperatures, the like, or any combination thereof.

As one example, removal of a string may allow for the device to be expanded into the open and active configuration. The string may retain the wires within the channel, applying tension to and holding the tubular member in a constrained, inactive, and closed configuration. The string may be removed to remove the tension. The string may be pulled via the handle. The string may be pulled away from the proximal end of the tubular member, toward a user, or both. Upon pulling the string, the string may be removed from the wires. Upon pulling the string, the plurality of wires may be released from inside of the tubular member. Once released, the wires may recoil toward the outer surface of the tubular member. The tubular member may expand into an open and active configuration. The tubular member may then expand into a predetermined dimension, dilating the anatomical cavity. The plurality of wires, once released, may push against the plurality of pleats of the expandable outer soft material with equally distributed forces. The plurality of wires, once released, may release tension from the pleats. Thus, the removal of the force of the wires (applying tension in the form of inward pressure) and/or the application of force from the wires (e.g., applying outward pressure) may force the tubular member into expansion.

As another example, exposing the device to a significant change in temperature may allow for the device to be expanded into the open and active configuration. Upon insertion into a human cavity, the tubular member may be exposed to the temperature within a human body. Upon being exposed, the tubular member material and/or wire material may be activated. Upon activation, the material(s) may begin to expand. To increase the rate of expansion, warming or cooling may be applied via air, a surface, liquid, or a combination thereof inserted into or in the proximity of the channel.

The string may have an in-use position. Once pulled out of the tubular member, the string may be temporarily attached at the proximal end of the tubular member. The proximal end may be an end facing an outer portion of the cavity, such as the outer cervix. The string may be affixed such as to allow manual control of the device when inside the cavity. The string may be attached via a hook. The hook may be affixed to the base of the tubular member when in the expanded, open and active configuration, towards the proximal end. A distal end of the string may be configured as the hook. The hook may also be the blunt tip. For example, distal, blunt tip of the string can be designed as a hook attached to the very last coil of metallic elastic tubular material. Once the device is manually triggered to open by untwisting the base of the distal part of the tubular component (base) and or pushing the string up, the tip of the string may disengage from the elastic coil, to a straight upward position ready to pass up towards the uterine cavity for measurements or down through the elastic coils releasing them to an expanded, open tubular pass through dilated position. The tip of the string can very well be straight when the string is attached to the base by the locking clip. The shape and consistency of the tip of the string can encompass a multitude of forms and materials and is not limited to the description of present embodiment.

The device may have a twisting or twisted configuration. The twisted configuration may allow for insertion and/or removal of the device from the anatomical cavity. The twisting of the base, proximal part, may allow compressing of the expanded tubular device, if needed at the end of the surgical procedure for removal and disposal. The tubular structure may appear twisted around the string in inactive compressed state and untwisted once the string is ready to be removed or already released out of the metallic coils into an active dilated position. Twisting of the tubular member around the string is optional.

The size and shape of the device can be as depicted in FIGS. 1 through 16D, conical with one much smaller end (minimal size 2-3 mm allowing passage through stenotic, closed cervix free of trauma) to be inserted into the cervix or desired anatomical orifice and an opposite much larger base (10-12 mm) attached to the handle for hand instrumentation or to the powered activator for triggering advancement inside the cervix/cavity.

It should be appreciated that the dimensions of the various components can vary as determined according to the targeted anatomical orifice (stricture) to instrument and or dilate. For uterine cervix suggested dimensions (which can be adjusted according to results from clinical trials) and design of device are 2-3 mm diameter at the tip and 10-12 mm diameter at the proximal base where the handle and the string are attached with a to be determined length. The conical design allows a very small distal end to open strictures or closed anatomical passages otherwise meant to be open, like the uterine cervix (but also anal canal or urethra) non traumatic. Also allows the proximal larger base to be handled by the user with ease.

The device may be part of a kit. The kit may include one or more strings, one or more locking clips, or any combination thereof. The kit may include a single string or multiple strings. The kit may include a device already having one string affixed thereto with other strings provided separately. The kit may include a single locking clip or multiple locking clips. The kit may include one clip per string, such that each locking clip is associated with a string.

ILLUSTRATIVE EXAMPLES

The following descriptions of the Figures are provided to illustrate the teachings herein but are not intended to limit the scope thereof. For example, the sleeve of FIG. 9 may be combined with the wires and string of FIG. 11. For example, the compression of FIG. 16A may be combined with the wire and/or string of FIG. 11.

FIG. 1 illustrates a device 101. The device includes a tubular member 103. The tubular member 103 is flexible. The tubular member 103 forms a channel 104. The channel is narrowed or closed off when the device 101 is in a closed and inactive configuration 900. Within the channel 104 are a plurality of wires 106. The plurality of wires 106 obstruct the channel 104 when in a closed and inactive (e.g., non-dilated) configuration 900. A string 105 extends into the channel 104. The string 105 is engaged with the wires 106. The string 105 includes a proximal end 120 and a distal end 122. At the distal end 122, the string includes a tip 111. The tip 111 may be a blunt tip. At the proximal end 120, the string includes a handle 107. The handle 107 is ring-shaped. In the closed and inactive configuration 900, the tubular member 103 tapers toward the distal end 122 such as to have a generally conical shape.

Figure 2:
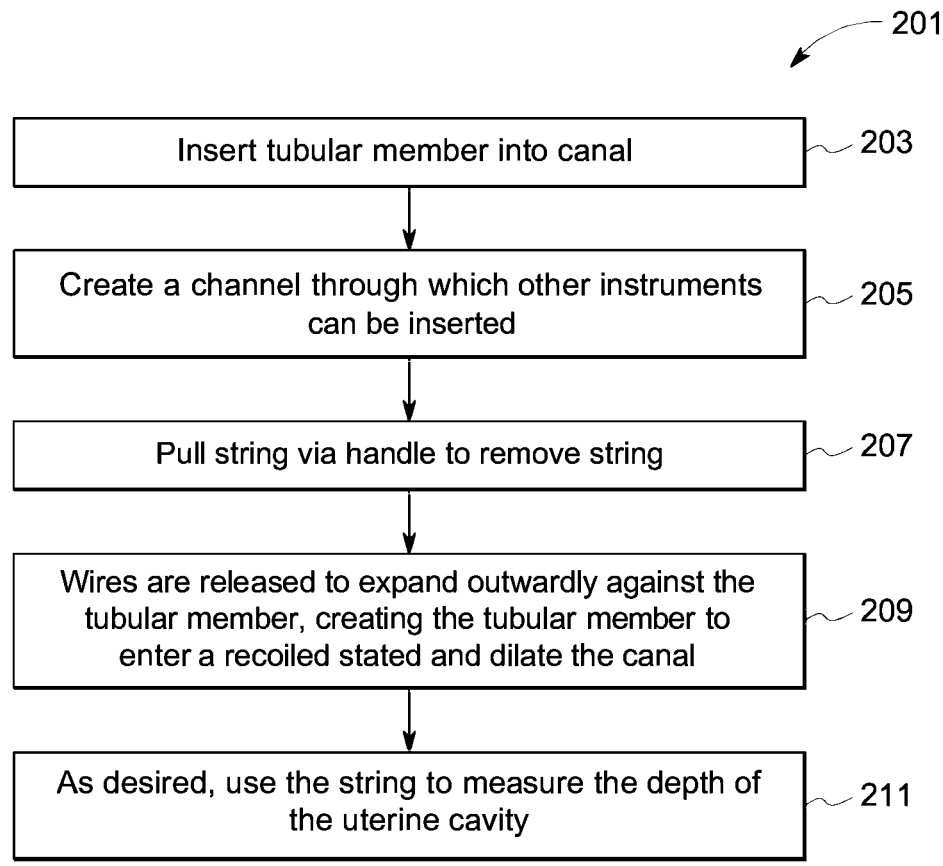
FIG. 2 is a flowchart of a method of use of the device of FIG. 1.

In FIG. 2, a flowchart 201 depicts a method of use of the device 101. During use, the tubular member 103 is inserted into a patient's cervix, cervical canal, or uterine opening (or anal canal or urethra, joint, abdominal cavity) such as to provide a passageway (channel 104) for other surgical devices such as hysteroscope, a curette, a rectoscope, a suctioning catheter, polyp scissors, basket, etc., as shown with boxes 203, 205. Next, the string 105 can be pulled out to trigger the expansion and opening of the tubular member, as shown with box 207. In other words, the string 105 is triggering expansion of the tubular member 103 from a closed and inactive configuration 900 to an open and active configuration 902. The handle allows for the user to manipulate the string, such as to pull the string downward and out of the canal, such as to release wires 106 into expansion, as shown with box 209. This causes the wires 106 to exert force against the interior of the tubular member to create a predetermined dimension of the tubular member within the canal and thereby open and or dilate the canal.

Optionally and depending on the needed use, the string 105 can be first or later be pushed up towards the uterine fundus to sound (i.e., measure the depth of) a cavity (e.g., uterine cavity), as shown with box 211. In this case, the string 105 may have the blunt end 111.

Figure 3:
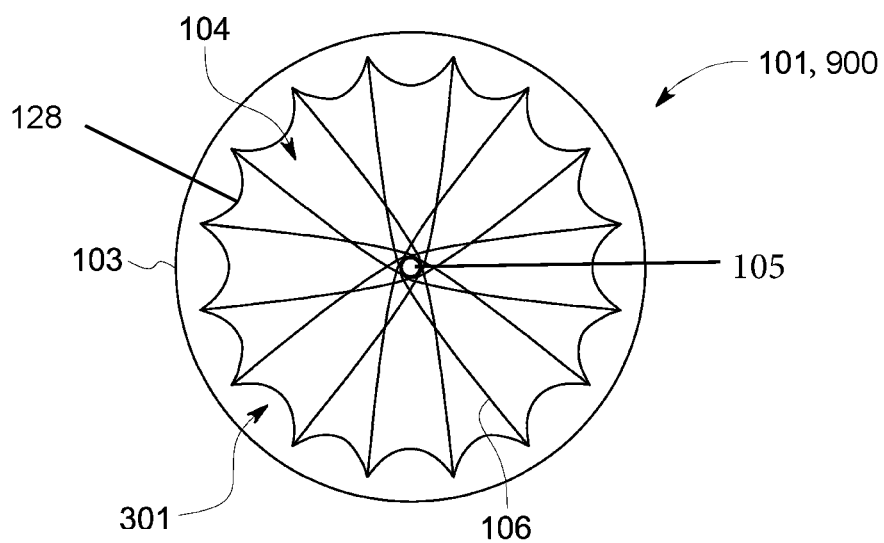
FIG. 3 is a cross sectional view taken from FIG. 1 in inactive, closed position.

FIG. 3 illustrates a cross-section view taken along line 3 of FIG. 1. FIG. 3 illustrates a device 101 in a closed and inactive configuration 900. The device 101 includes a tubular member 103. The tubular member 103 is flexible. The tubular member 103 includes a plurality of pleats 128. The pleats 128 may face inward (as shown), outward, or both. The tubular member 103 forms a channel 104 (e.g., hollow channel) therethrough. The channel 104 may be narrowed, closed off, or otherwise restricted when the device 101 is in a closed and inactive configuration 900. The tubular member 103 may include a metallic core 301. The metallic core 301 may be formed by a plurality of wires 106. The wires 106 as shown are centered and held together by the string 105. The string 105, by retaining the wires 106 together, holds the device in the closed and inactive configuration 900.

Figure 4:
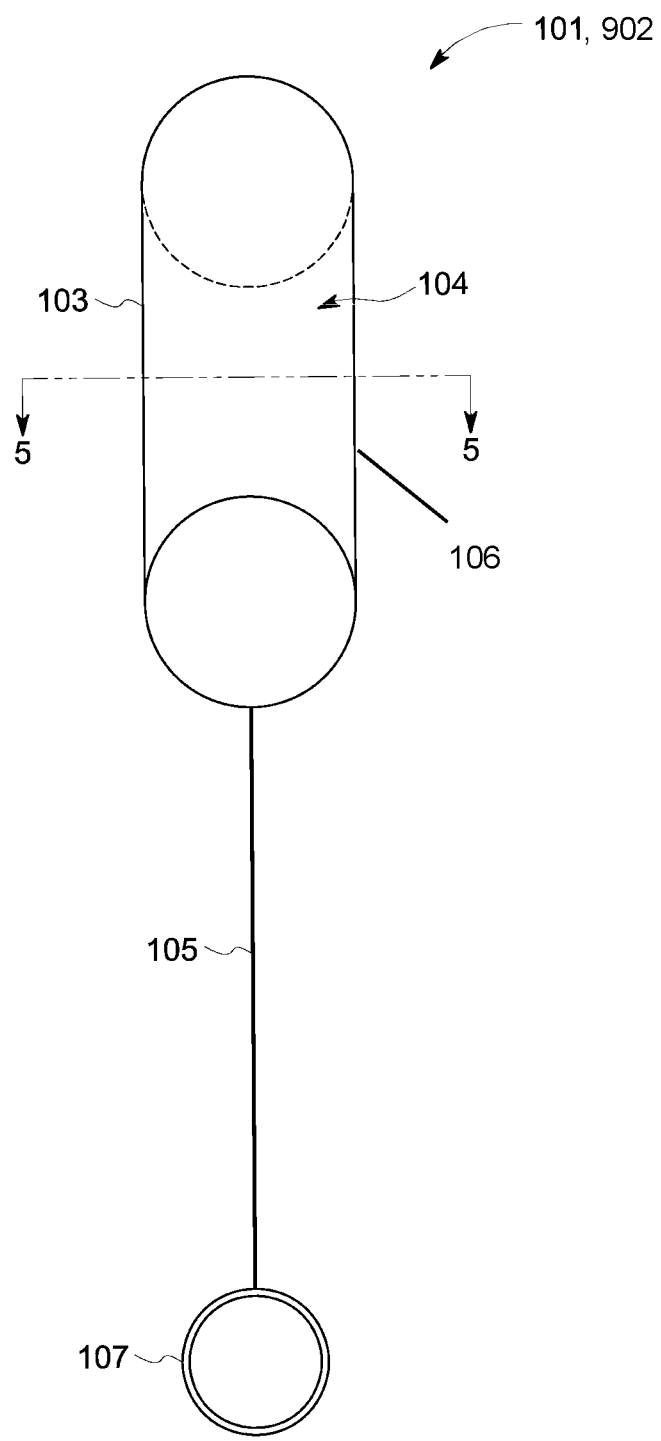
FIG. 4 is a front view of the device of FIG. 1 in a recoiled and dilated position.
Figure 5:
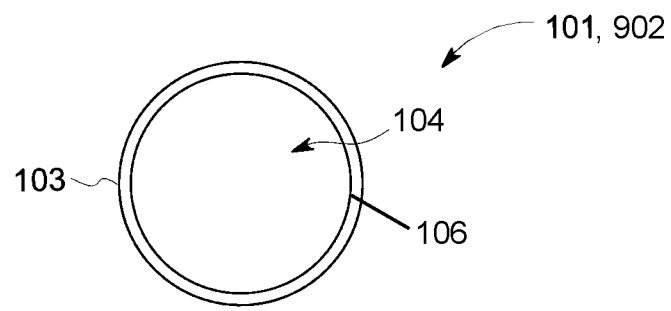
FIG. 5 is a cross sectional view taken from FIG. 4.

FIGS. 4 and 5 illustrate a device 101 in an open and active configuration 902. Once the string 105 is pulled away from the tubular member 103, the tubular member may expand. The string 105 may be pulled away from the tubular member 103 by the handle 107. Upon pulling the string 105, the plurality of wires 106 are released from being constrained within the inside of the tubular member 103 and recoil toward an interior surface of the tubular member. Upon recoiling, the plurality of wires exert an outward force on the interior of the tubular member. Due to the recoiling and outward force, the tubular member 103 expands into the open and active configuration 902 (e.g., dilates). Upon recoiling, the wires 106 may push against the surface of the tubular member 103, causing the expansion and providing for a hollow channel 104. In the open and active configuration 902, the wires 106 do not obstruct the channel 104. The channel 104 provides a passageway which extends through the proximal and distal ends of the tubular member. The hollow channel 104 allows for surgical devices and other instruments to pass through. In the open and active configuration 902, the tubular member 103 has a cylindrical shape.

In FIG. 5, a cross-sectional view taken from line 5 of FIG. 4 shows the device in the open and active configuration, such that the channel 104 is open.

Figure 6:
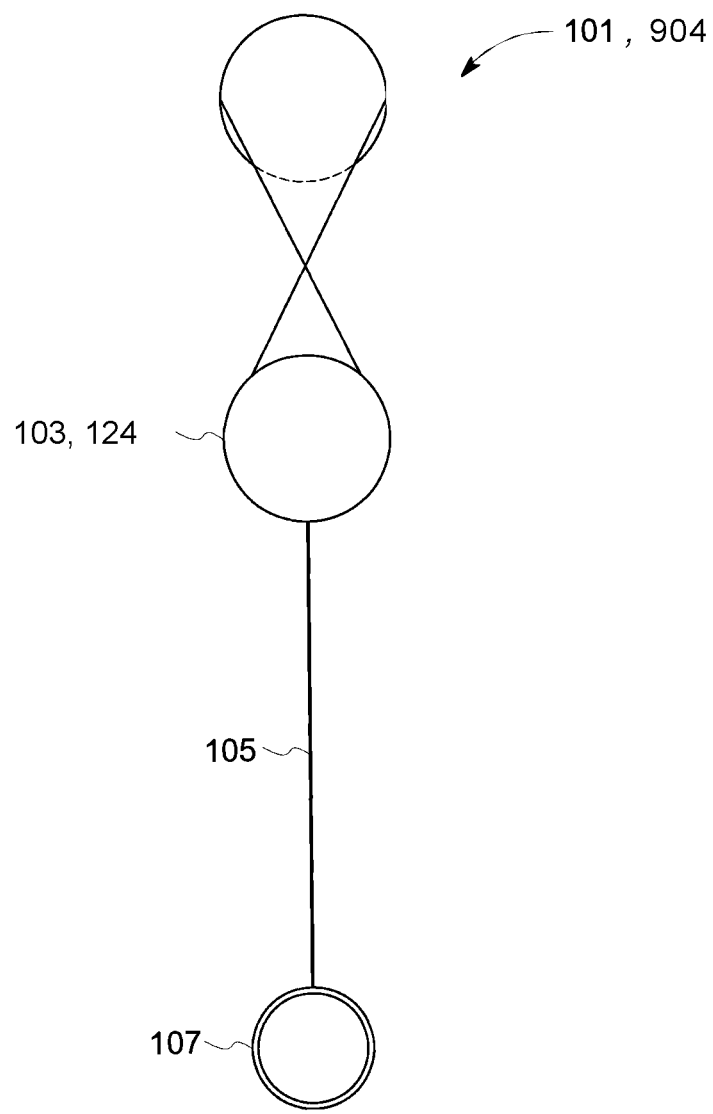
FIG. 6 is a front view of the device of FIG. 1 showing a twisting configuration.

FIG. 6 illustrates the device 101 in a twisted configuration 904. The device 101 can be twisted or crumpled to minimize its diameter and allow for insertion or removal. The device may be twisted by twisting the proximal end of the tubular member 103.

Figure 7A:
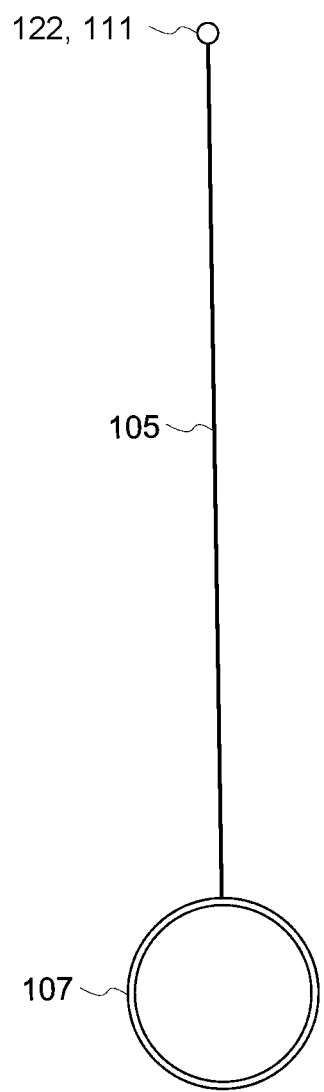
FIG. 7A illustrates a handle and a string configuration.

In FIG. 7A, the string 105 is shown as a reinforced coil with a blunt end 111. The blunt end 111 is located at the distal end 122. The distal end 122 may be towards the uterine cavity.

Figure 7B:
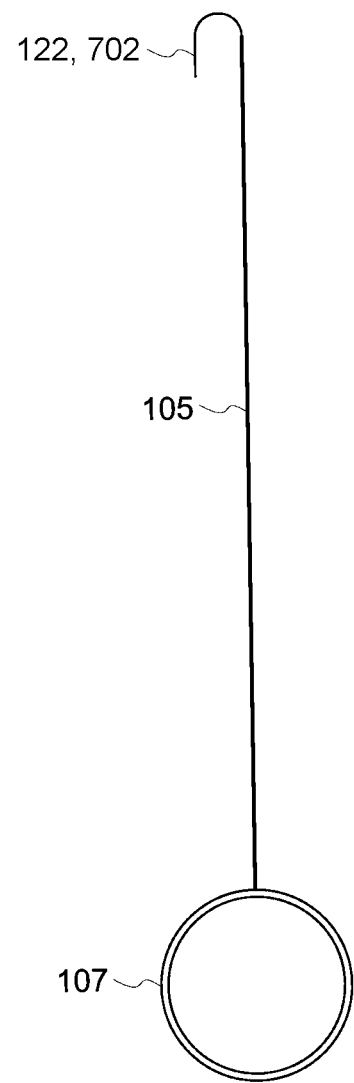
FIG. 7B illustrates a handle and string configuration.

In FIG. 7B, the string can include a hook 702. The hook 702 is at the distal end 122.

Figure 8:
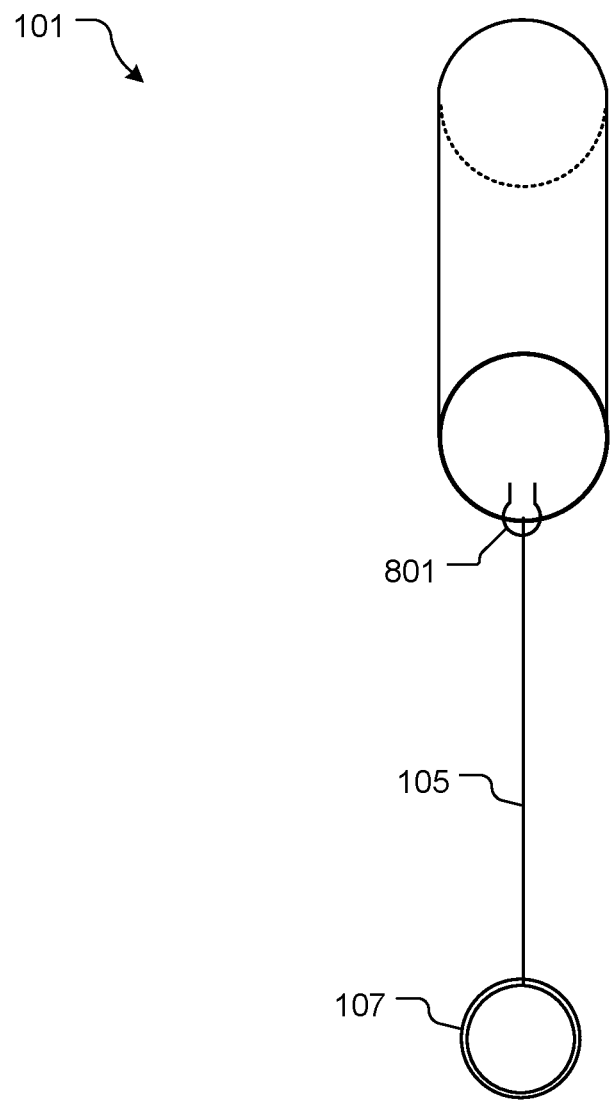
FIG. 8 is a front view of a device with a locking clip mechanism for the string.

In FIG. 8, a front view depicts the device 101 having the string 105 supported by a locking clip 801.

Figure 9:
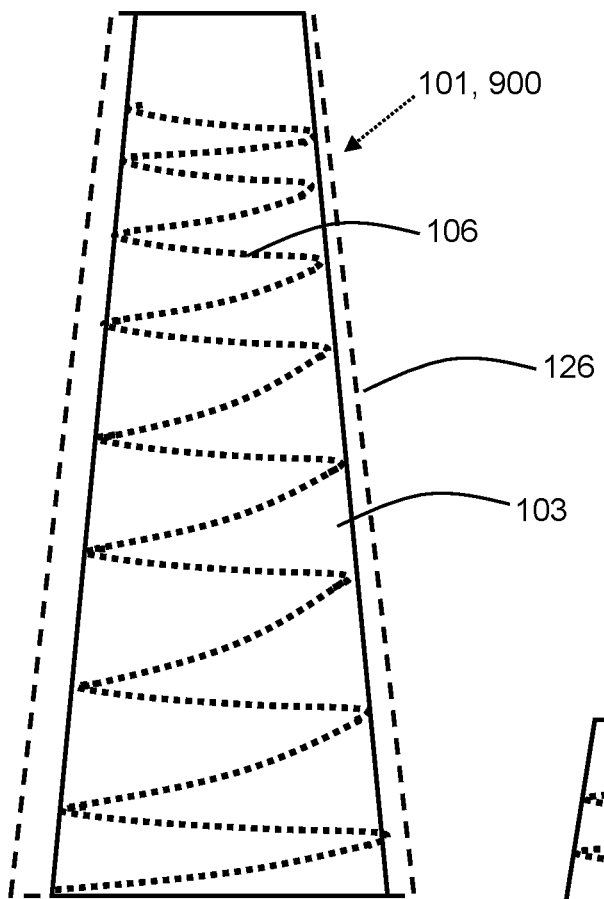
FIG. 9 is a front view of a device in a closed and inactive configuration.

FIG. 9 illustrates a front view of a device 101. The device 101 is in a closed and inactive configuration 900. The device 101 includes a tubular member 103. The tubular member 103 has a conical shape tapering toward the distal end. Within the tubular member 103 is one or more coils of one or more wires 106. About the tubular member 103 and wires 106 is a sleeve 126. The sleeve 126 is shown as transparent (e.g., broken line) to illustrate the tubular member 103 within it. The sleeve 126 applies compression to both the wires 106 and the tubular member 103. Upon removal of the sleeve 126, the wires 106 are allowed to recoil or expand. By expanding, the wires 106 apply an outwardly force to the tubular member 103, allowing for the tubular member 103 to expand, such as illustrated in FIG. 11.

Figure 10:
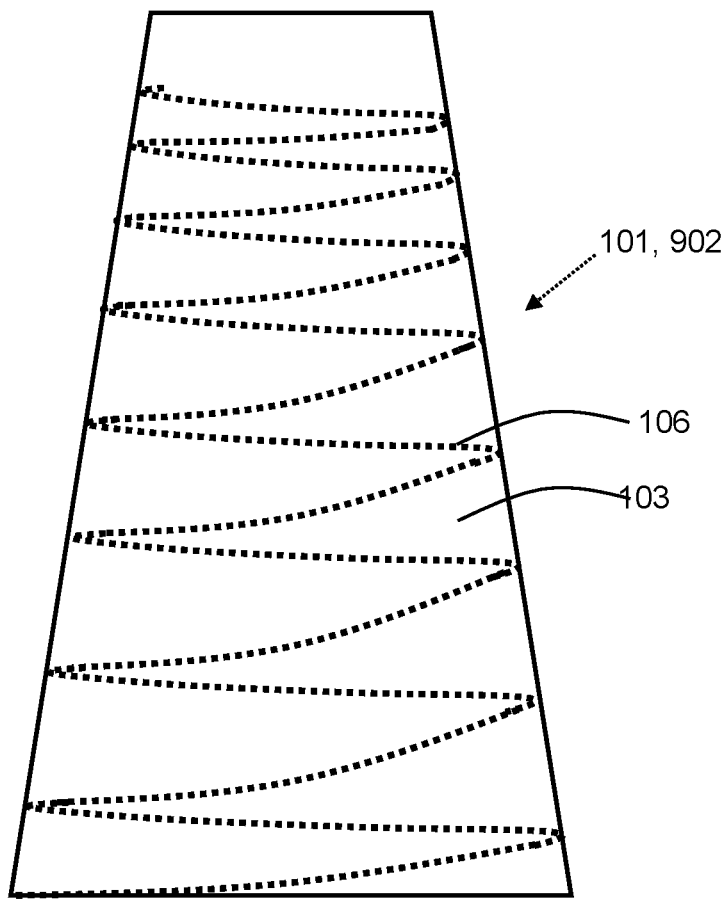
FIG. 10 is a front view of a device in an open and active configuration.

FIG. 10 illustrates a front view of a device 101. This may be after removal for a sleeve 126 (not shown). The device 101 is in an open and active configuration 902. The device 101 includes a tubular member 103 and wires 106. The tubular member 103 may take on a wider conical shape or a cylindrical shape after removal of the sleeve 126 (not shown).

Figure 12:
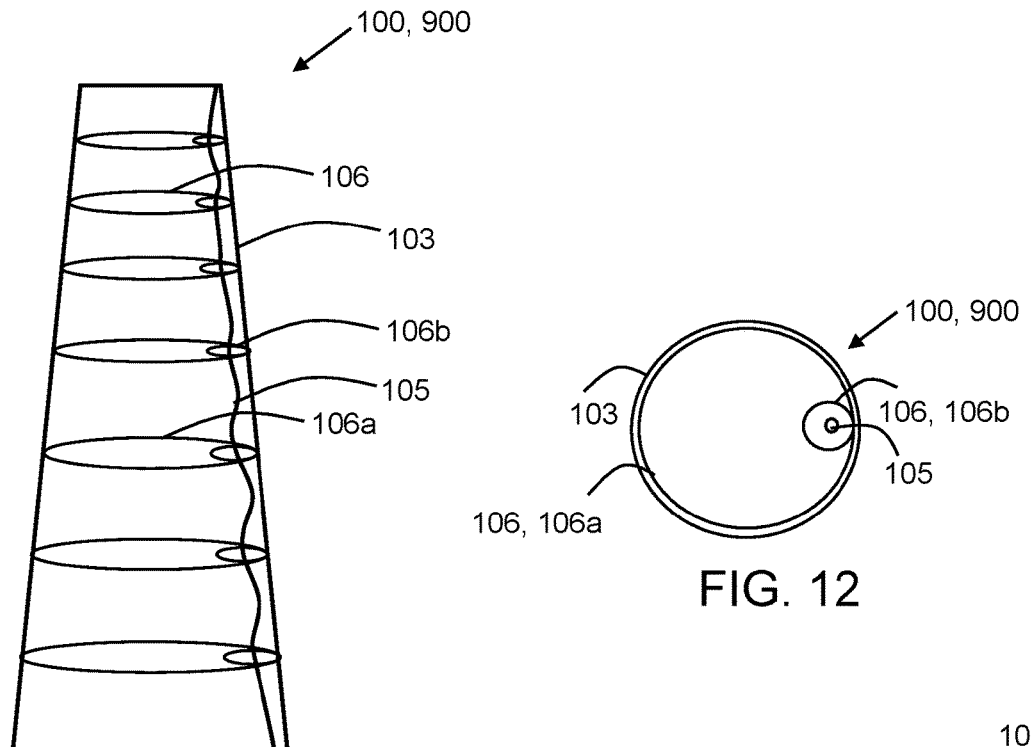
FIG. 12 is a cross-section view of a device in a closed and inactive configuration.
Figure 11:
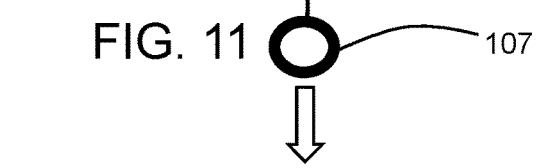
FIG. 11 is a front view of a device in a closed and inactive configuration.

FIG. 11 illustrates a front view of a device 101 and FIG. 12 illustrates a cross-section of the device 101 at a coil of wire 106. The device 101 is in a closed and inactive configuration 900. The device 101 includes a tubular member 103. Within the tubular member 103 is a plurality of coils of one or more wires 106. The coils 106 are in a twisted and recoiled configuration such that each coil of wire 106 has a main coil 106a and a pass-through coil 106b. For example, each coil of wire 106 is twisted into a "FIG. 8" to form the main coil 106a and pass-through coil 106b and then folded such that the pass through coil 106b overlaps the main coil 106a. A string 105 passes through the coil of wires 106. The string 105 passes through the pass-through coil 106b. The string 105 includes a handle 107. The handle 107 may be used to pull the string 105 away from the tubular member 103 and out of the wires 106.

Figure 14:
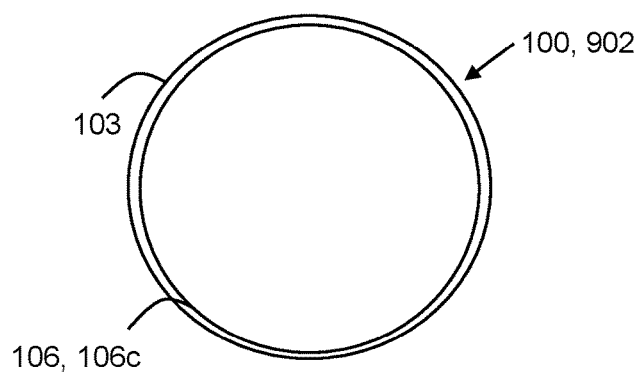
FIG. 14 is a cross-section view of a device an open and active configuration.
Figure 13:
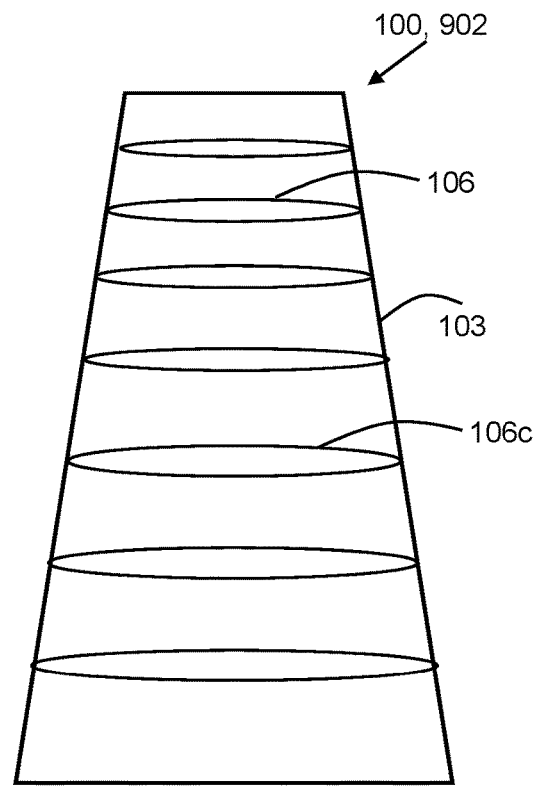
FIG. 13 is a front view of a device an open and active configuration.

FIG. 13 illustrates a front view of a device 101 and FIG. 14 illustrates a cross-section of the device 101 at a coil of wire 106. As can be seen, the coils of wire 106 are in an expanded state forming the expanded coil 106c. The expanded coil 106c applies an outward pressure to the tubular member 103 such that it expands to cause dilation of a cavity.

Figures 15A, 15B:
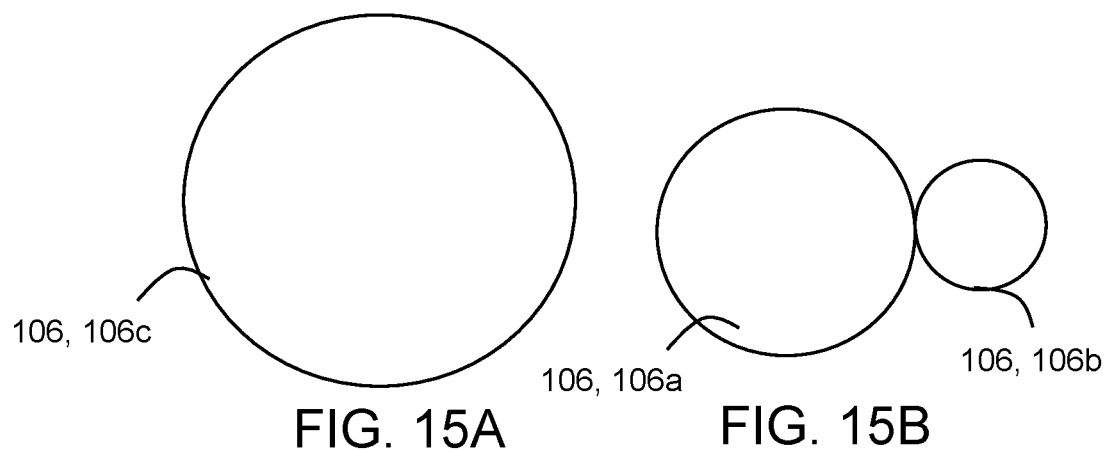
FIG. 15A is a coil of wire in an expanded state.
FIG. 15B is a coil of wire when twisted.
Figure 15C:
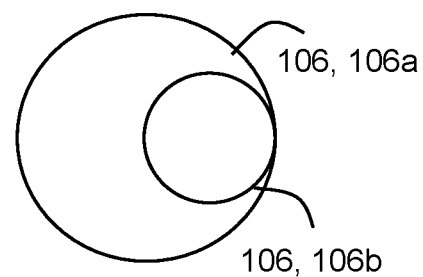
FIG. 15C is a coil of wire when twisted and overlapping.

FIGS. 15A-15C illustrate twisting and untwisting of a coil of wire 106. The expanded coil 106c is compressed by twisting the coil 106 into a main coil 106a and a pass-through coil 106b. The pass-through coil 106 then overlaps the main coil 106a. A string 105 (such as shown in FIG. 11) may hold the wire 106 in the compressed state. Upon removal of the string 105 or other compressive force (e.g., such as sleeve), the wire 106 may untwist and expand into the expanded state 106c.

Figure 16A:
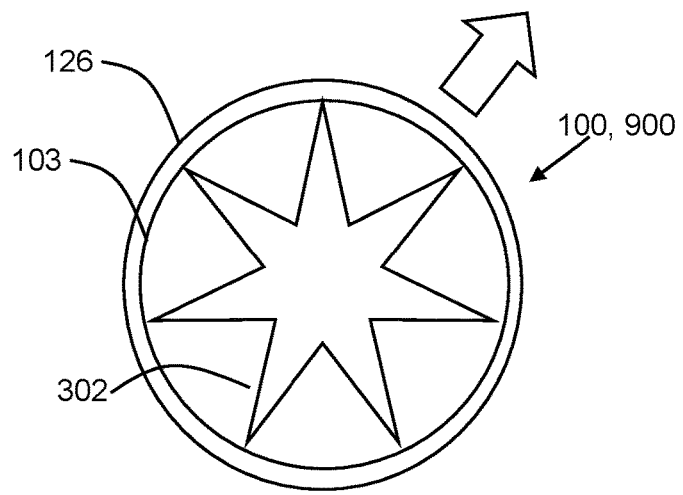
FIG. 16A is a cross-section view of a device in a closed and inactive configuration.
Figure 16B:
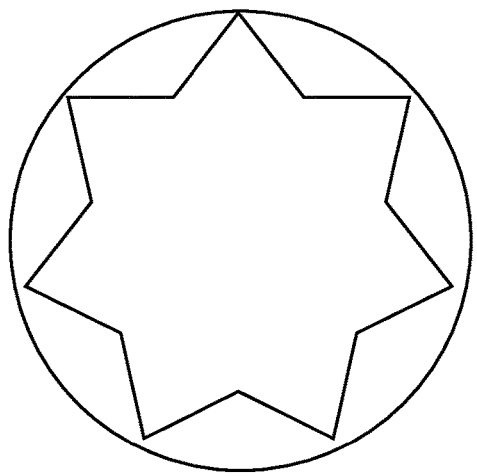
FIG. 16B is a cross-section view of a device expanding.
Figure 16C:
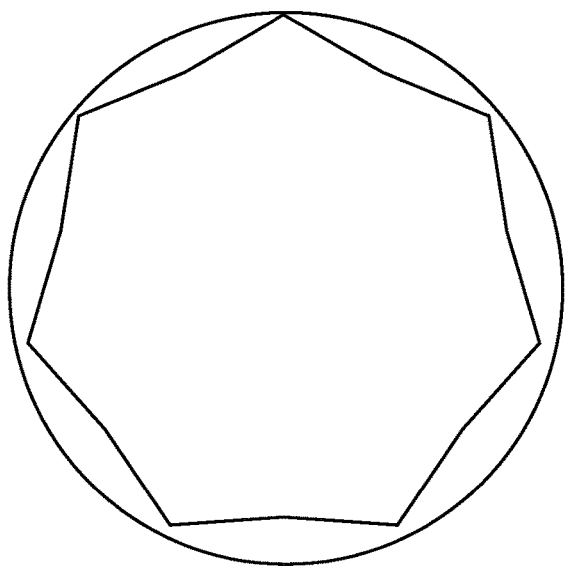
FIG. 16C is a cross-section view of a device expanding.
Figure 16D:
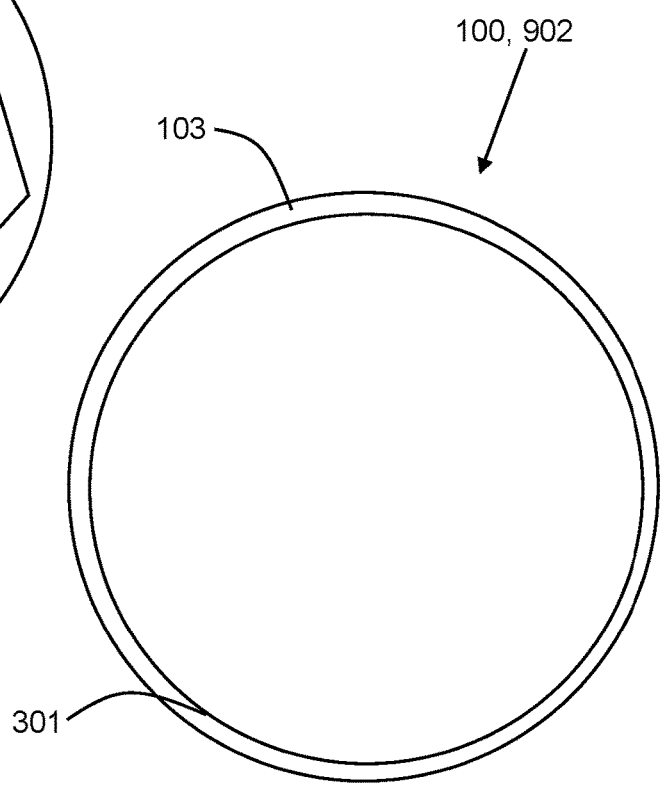
FIG. 16D is a cross-section view of a device in an open and active configuration.

FIGS. 16A-16D illustrate expansion of a device 101 from a closed and inactive configuration 900 to an open and active configuration 902. A sleeve 126 holds the device 101 in the closed and inactive configuration 900. The tubular member 103 includes a core 302 therein. The tubular member 103 itself provides for a soft and expandable outer surface. The core 302 provides for an expanding surface which can apply an outward force to the tubular member 103 and even overcome the pressure or force applied by the canal such as to cause dilation. The core 302 is folded, such as forming a star shape. The sleeve 126 restricts the core 302 from expanding. Upon removal of the sleeve 126, the core begins to expand, also expanding the tubular member 103. Expansion continues until the device 101 reaches the open and active configuration 902 as shown in FIG. 16D. While a sleeve 126 is contemplated, any mechanism allowing for compression and/or expansion as discussed herein may be utilized. For example, string 105, wire 106, material properties (e.g., thermal expansion, elastic expansion) of the core 302 and/or the tubular member 103.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

LIST OF REFERENCE NUMBERS

101—Device
103—Tubular member
104—Channel
105—String
106—Wires
107—Handle
111—Blunt tip
120—Proximal end
122—Distal end
124—Proximal end of tubular member
126—Sleeve
128—Pleats
201—Method of using device
203—Insertion step
205—Channel creation step
207—Pulling string step
209—Wires released step
211—Measurement step
301—Metallic core
302—Core
702—Hook
801—Locking clip
900—Closed and inactive configuration
902—Open and active configuration
904—Twisted configuration Any numerical values recited in the above application include all values from the lower value to the upper value in increments of one unit provided that there is a separation of at least 2 units between any lower value and any higher value. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints.

The terms "generally" or "substantially" to describe angular measurements may mean about +/−10° or less, about +/−5° or less, or even about +/−1° or less. The terms "generally" or "substantially" to describe angular measurements may mean about +/−0.01° or greater, about +/−0.1° or greater, or even about +/−0.5° or greater. The terms "generally" or "substantially" to describe linear measurements, percentages, or ratios may mean about +/−10% or less, about +/−5% or less, or even about +/−1% or less. The terms "generally" or "substantially" to describe linear measurements, percentages, or ratios may mean about +/−0.01% or greater, about +/−0.1% or greater, or even about +/−0.5% or greater.

The term "consisting essentially of" to describe a combination shall include the elements, ingredients, components, or steps identified, and such other elements ingredients, components or steps that do not materially affect the basic and novel characteristics of the combination. The use of the terms "comprising" or "including" to describe combinations of elements, ingredients, components, or steps herein also contemplates embodiments that consist essentially of the elements, ingredients, components, or steps.

Plural elements, ingredients, components, or steps can be provided by a single integrated element, ingredient, component, or step. Alternatively, a single integrated element, ingredient, component, or step might be divided into separate plural elements, ingredients, components, or steps. The disclosure of "a" or "one" to describe an element, ingredient, component, or step is not intended to foreclose additional elements, ingredients, components, or steps.

What is claimed is:

1. A device configurable between a closed configuration and an open configuration to form a passageway for passage of a surgical instrument therethrough, the device comprising:
   a) a tubular member which is flexible, wherein the tubular member is configured to expand from the closed configuration to the open configuration;
   b) a channel formed in the tubular member when in the open configuration which provides the passageway through the tubular member;
   c) one or more wires inside of the tubular member biased toward the open configuration; and
   d) one or more biasing devices configured to pass through the one or more wires to restrict the one or more wires in the closed configuration; and
      wherein removal of the one or more biasing devices causes the one or more wires to become unrestricted and exert a radially outward force on an interior wall of the tubular member such that the tubular member radially expands from the closed configuration to the open configuration.

2. The device of claim 1, wherein the one or more biasing devices include one or more strings, the one or more strings extending through a length of the tubular member and pass through the one or more wires thus restricting the one or more wires and holding the tubular member in the closed configuration.

3. The device of claim 1, wherein one or more biasing devices include one or more sleeves, the one or more sleeves being located about a length of the tubular member and compressing the tubular member and the one or more wires into the closed configuration.

4. The device of claim 1, wherein the tubular member is configured to remain in the closed configuration before expanding by having one or more sleeves applying compression about an exterior of the tubular member, one or more wires applying compression about the exterior of the tubular member, one or more wires applying tension within the interior wall of the tubular member, the tubular member being temperature activated, or any combination thereof.

5. The device of claim 1, wherein the tubular member comprises one or more tubular member materials and the one or more wires comprise one or more wire materials;
   wherein the one or more tubular member materials and the one or more wire materials include one or more metals, one or more polymers, or both;
   wherein the one or more metals include stainless steel, copper, nickel, titanium, cobalt chrome, aluminum, magnesium, gold, platinum, silver, iridium, tantalum, Nitinol, one or more alloys thereof, or one or more combinations thereof; and
   wherein the one or more polymers include medical grade silicone, polyvinylchloride, polypropylene, Polytetrafluoroethylene, Polymethylmethacrylate, Trimethylcarbonate, TMC NAD-lactide, or a combination thereof.

6. The device of claim 5, wherein the one or more metals is Nitinol, and wherein the Nitinol is a highly elastic Nitinol, temperature activated Nitinol, Memory Shape Alloy, or any combination thereof.

7. The device of claim 5, wherein the one or more metals is Nitinol, and wherein the Nitinol is shape trained such that the Nitinol is pre-trained to remember a desired shape at the open configuration;
   wherein the Nitinol is able to be compressed into the closed configuration by the one or more biasing devices; and
   wherein upon removal of the one or more biasing devices, application of a change in temperature, or both the Nitinol reverts back to its original pre-trained state of the open configuration.

8. The device of claim 1, wherein the one or more biasing devices include one or more strings; wherein the one or more strings are located within a center of the tubular member, a side of the tubular member, the interior wall of the tubular member, an exterior of the tubular member, or any combination thereof; and
   wherein the one or more strings include at least one string attached to, engaged with, centered to, and/or passing through of the one or more wires and extending through the channel.

9. The device of claim 1, wherein the one or more biasing devices include one or more strings; and wherein the one or more strings at a distal end includes a blunt tip, a sharp tip, a needle tip, a suction tip, an optical viewing device, one or more medical treatments, or any combination thereof.

10. The device of claim 1, wherein the one or more biasing devices include one or more strings; and wherein the one or more strings is configured as a catheter and includes one or more suction devices affixed thereto.

11. The device of claim 1, wherein the device is configured to be inserted into an anatomical orifice when in the closed configuration, and wherein when the tubular member is in the open configuration, the tubular member has a cylindrical shape that allows for easy passing of the surgical instrument through the anatomical orifice.

12. The device of claim 1, wherein the one or more biasing devices include one or more sleeves, wherein the one or more sleeves are located about the tubular member, about the one or more wires, or both.

13. The device of claim 1, wherein the device includes one or more soft coatings about an exterior of the tubular member.

14. The device of claim 1, wherein the device includes or is affixed to one or more automated devices which are powered and configured to cause expansion of the device into the open configuration, compression into the closed configuration, compression into a twisted configuration, or any combination thereof.

15. The device of claim 1, wherein in the closed configuration, each wire of the one or more wires overlaps with itself or another wire of the one or more wires.

16. The device of claim 1, wherein in the closed configuration, the one or more wires extend radially inward from the interior wall of the tubular member to overlap one another.

17. The device of claim 1, wherein the one or more wires are equally distributed across the radius and length of the tubular member such that the one or more wires overlap at a center of the tubular member.

18. The device of claim 1, wherein each wire overlaps with itself by way of a twisted configuration.

19. A method using a device for providing a passageway into an anatomical orifice, the method comprising:
   a) inserting the device into the anatomical orifice, the device configurable between a closed configuration and an open configuration, wherein the device comprises:
      a tubular member which is flexible, wherein the tubular member is configured to expand from the closed configuration to the open configuration;
      a channel formed in the tubular member when in the open configuration which provides the passageway through the tubular member;
      one or more wires inside of the tubular member biased toward the open configuration; and
      one or more biasing devices configured to restrict one or more wires in the closed configuration; and
   b) expanding the device by removing one or more biasing devices such that the one or more wires become unrestricted and exert a radially outward force on an interior wall of the tubular member to provide for expansion of the device from the closed configuration to the open configuration thus forming the channel within the tubular member of the device, wherein upon expansion into the open configuration, the device provides the passageway for one or more surgical instruments in the anatomical orifice and causes dilation of the anatomical orifice.

20. The method of claim 19, wherein removal of the one or more biasing devices includes pulling one or more strings and/or removing a sleeve; and
   wherein removal of the one or more biasing devices causes the one or more wires to exert the radially outward force against the interior wall of the tubular member such that the tubular member takes on a diameter of a predetermined dimension.

21. The method of claim 20, wherein upon removal of the one or more biasing devices, a plurality of pleats of the tubular member expand such that the tubular member takes on the diameter of a predetermined position.

22. The method of claim 19, wherein the device is expanded by being exposed to a change in temperature within a human body.

23. The method of claim 19, wherein the method includes inserting the one or more surgical instruments through the passageway formed in the channel and into a cavity of a patient.

24. A device configurable between a closed configuration and an open configuration to form a passageway for a surgical instrument, the device comprising:
   a) a tubular member which is flexible, wherein the tubular member is configured to expand from the closed configuration to the open configuration;
   b) a channel formed in the tubular member when in the open configuration which provides the passageway of the tubular member;
   c) one or more wire coils inside of the tubular member, wherein in the closed configuration, each wire coil is in a twisted configuration such that each wire coil has a main coil and a pass-through coil overlapping the main coil;
   d) at least one biasing device configured to apply a compressive force to each wire coil to maintain the twisted configuration of each wire coil such that the tubular member remains in the closed configuration; and
   wherein removal of the at least one biasing device causes the one or more wire coils to untwist and move into an untwisted configuration such that the one or more wire coils exert an outward force in a radial direction on an interior wall of the tubular member such that the tubular member expands in the radial direction from the closed configuration to the open configuration.

* * * * *